July 23, 1929.  J. J. CAMPODONICO  1,721,769

TRACTION WHEEL

Original Filed July 5, 1924   2 Sheets-Sheet 1

Inventor.
John J. Campodonico.
By Dewey, Strong, Townsend & Loftus
Attorneys.

July 23, 1929.     J. J. CAMPODONICO     1,721,769
TRACTION WHEEL
Original Filed July 5, 1924    2 Sheets-Sheet 2
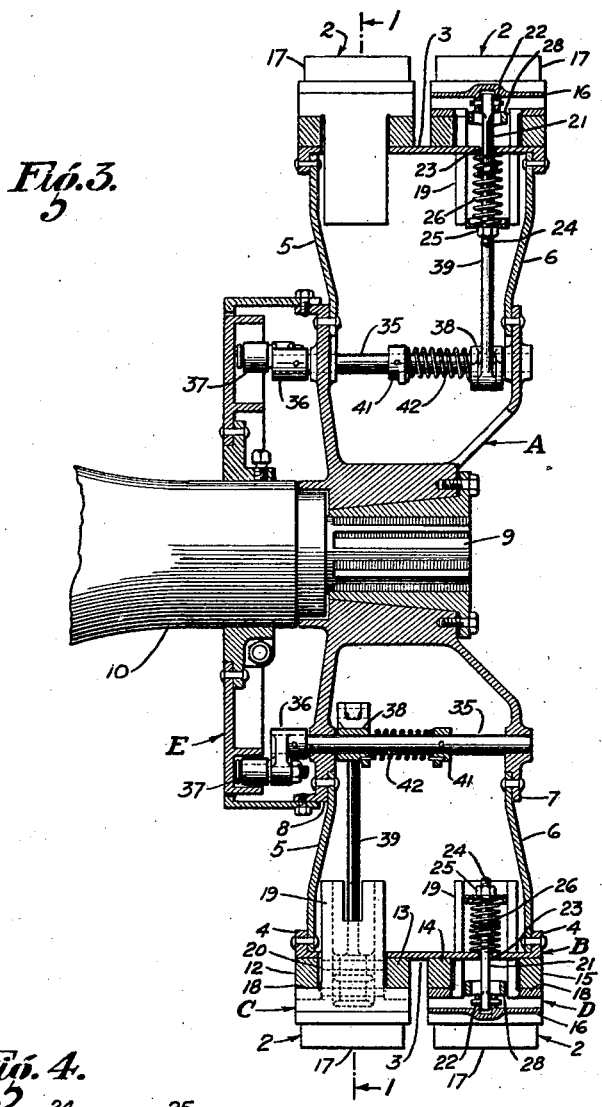
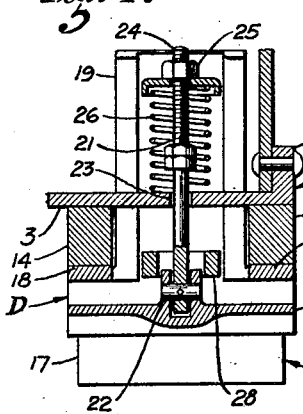
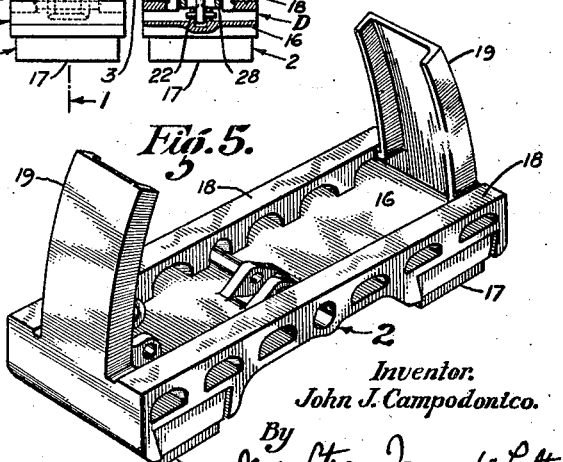
Inventor.
John J. Campodonico.

Patented July 23, 1929.

1,721,769

UNITED STATES PATENT OFFICE.

JOHN J. CAMPODONICO, OF STOCKTON, CALIFORNIA.

TRACTION WHEEL.

Application filed July 5, 1924, Serial No. 724,272. Renewed December 17, 1928.

This invention relates to traction wheels, and particularly to improvements on the structure shown in my former patent entitled "Traction wheel", No. 1,370,409, issued March 1, 1921.

The object of the present invention is to generally improve and simplify the construction and operation of traction wheels of the character described; to provide a series of staggered shoes or tread members which are so attached to the rim of the wheel that a flat and flexible track will be presented; to provide means whereby a positive driving connection is maintained between the shoes and the wheel; to provide means for preventing rattling of the shoes during high speed, and further, to provide means for properly positioning the shoes as they reach the ground when driving ahead and also when reversing.

One form which my invention may assume is exemplified in the following description and illustrated in the accompanying drawings, in which—

Fig. 3 is a central vertical cross-section taken on line 3—3 of Fig. 1.

Fig. 4 is an enlarged cross-section taken on line 4—4 of Fig. 1.

Fig. 5 is a perspective view of one of the shoes.

Figure 1:
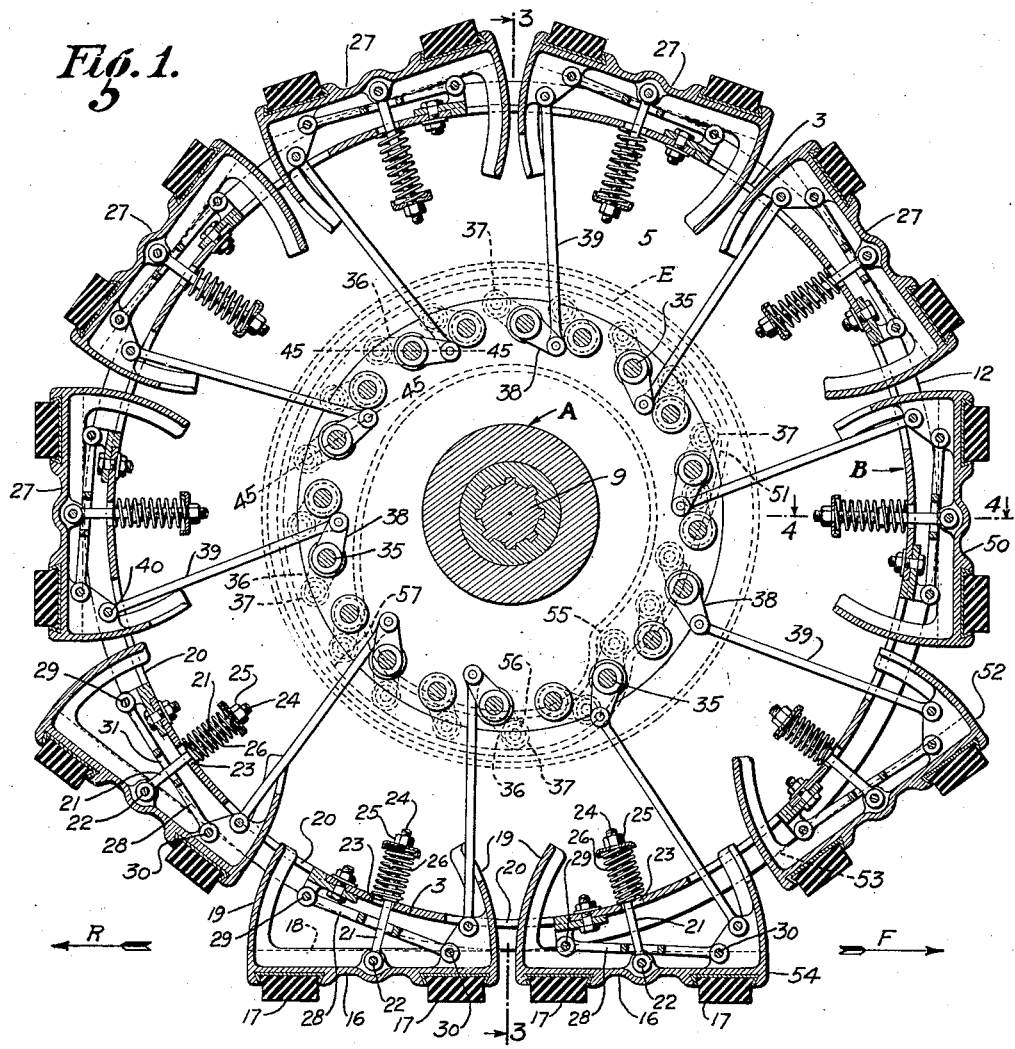
Fig. 1 is a central vertical section taken on line 1—1 of Fig. 3.
Figure 2:
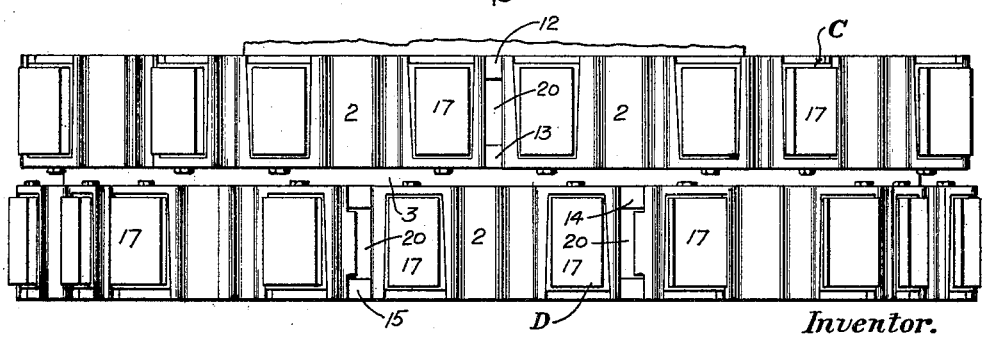
Fig. 2 is a plan view of the wheel showing certain of the shoes removed.

Referring to the drawings in detail, and particularly to Figs. 1, 2 and 3, it will be seen that the wheel consists broadly of a central hub section A, a rim B, and a pair of track sections C and D. Each track section consists of a plurality of independent shoes, generally indicated at 2, which shoes are staggered with relation to each other. The specific construction of the shoes and the manner of mounting and actuating the same will hereinafter be more fully described.

The rim B is channel-shaped in cross-section and as such presents a face 3 and a pair of side flanges 4. The rim is secured with relation to the hub by means of side plates or disks 5 and 6, these disks being riveted at their outer periphery to the side flanges 4 and at their inner periphery to annular side flanges 7 and 8 formed on the hub.

The hub proper is supported by a driving axle 9 and it may be splined, keyed or otherwise secured thereto. The axle is journalled in a housing 10 and this housing forms a support for a stationary cam member generally indicated at E; this cam serving the function of rocking the individual shoes with relation to the rim of the wheel, so as to properly position the same as they reach the ground over which the wheel is travelling.

The rim or face 3 of the wheel serves as a support for two pairs of annular continuous ring-shaped track members generally indicated at 12, 13, 14 and 15. These track members are suitably secured to the rim 3 and they are interposed between the rim and the traction shoes generally indicated at C and D. The shoes proper are perhaps best illustrated in Figs. 1, 4 and 5. They consist of a base plate 16, on the outer face of which are secured grousers 17. The inner face of each shoe is provided with a pair of flat flange members 18. These flanges are disposed one on each side of the shoe and extend from end to end, the flanges being presented to the rails or track members 12, 13, 14 and 15, as the traction wheel rotates. Each shoe is otherwise provided with a pair of curved end sections 19. These end sections extend through slots or openings 20 formed in the rim 3 of the wheel and they are guided in these openings, the end sections 19 forming the function of securing the respective shoes against lateral movement with relation to the wheel. The flanges of the shoes are maintained in engagement with the track sections 12, 13, 14 and 15 at all times and a free rocking movement of each shoe with relation to the track members is permitted.

The shoes are attached to the rim of the wheel by rods 21, the rods being pivotally secured to the center of each shoe as indicated at 22. The rods otherwise extend inwardly through openings 23 formed in the rim and they terminate in threaded ends 24 which are provided for the reception of washers and nuts as indicated at 25. A spring 26 is interposed between each washer and the rim and this spring serves the function of normally maintaining the central portion of each shoe in contact with the track members. The spring in other words functions to maintain the shoes in the position indicated at 27 (see Fig. 1). Other means are provided for securing the shoes with relation to the rim, and also to form a driving connection between each shoe and the rim to prevent slippage of the wheel with relation to the shoes. This is accomplished by providing a single link as indicated at 28.

There is one link for each shoe. One end of each link is pivotally attached to the rim of the wheel as indicated at 29, and the other end of each link is attached to a lug on the inner side of each shoe as indicated at 30.

Pivotal connections are made at each end and free oscillating or rocking movement is thus permitted. An opening 31 is formed in the center of each link and this opening is provided to permit the rod 21 to extend therethrough. The single link provided in connection with each shoe forms a positive driving connection between the wheel and the shoes, the links being placed under tension when the wheel is going ahead and under compression when reversing.

Two sets of links, oppositely connected, were employed in the structure shown in my former patent, but by mounting the shoes in the manner here illustrated, it has been found that one link may be eliminated as this link is made sufficiently heavy to take both the strain of compression and tension.

By referring to Fig. 1 it will be seen that the pivotal connections indicated at 29 and 30 assume an absolute alignment when the shoes reach a horizontal position with relation to a vertical radial line drawn through the wheel. This is of considerable importance as it permits each shoe and link to swing on a true arc with relation to the wheel rim without increasing or decreasing the length of the connecting links or without resorting to the necessity of forming a sliding connection between the shoes and the links. This method of connecting the links is disclosed in my former patent and it is merely referred to in this instance to illustrate that the same principle or method of connecting the links is employed.

It was previously stated in the specification that means are employed for properly positioning the shoes just prior to reaching the ground over which the wheel travels, this being true whether the wheel is travelling ahead or reversing. This is accomplished in the following manner:

Journalled between the annular hub flanges 7 and 8 are a series of cross-shafts 35, there being one shaft for each shoe. Secured on the inner end of each shaft behind the inner hub flange 7 is a crank arm 36, and carried by each crank arm is a roller 37, which travels within the stationary cam E. Freely mounted on each shaft 35 is a crank arm 38, and connecting said crank arms with the respective shoes are links 39, the links being pivotally secured at their opposite ends, first, to the cranks 38 and, secondly, to the shoes at the points indicated at 40.

Secured on each cross shaft 35 is a collar 41 and forming a connection between each collar 41 and the crank arms 38 are helical springs 42. These springs normally maintain the crank arms 36 and 38 in alignment, as indicated by dotted lines at 45—45, (see Fig. 1) but they at the same time permit independent movement of the crank arms 38 under certain conditions; for instance, when the shoes strike a rock or boulder, or when gravel or other obstructions should happen to become interposed between the flanges of the shoes and the track members.

The springs 42 in other words form a yielding connection between the shafts 35 and the crank arms 38 said yielding connections normally transmitting the movement of the crank arms 36 so that the cranks 36 and 38 will move in unison, but they nevertheless permit an independent movement of the crank arms 38 when occasion demands.

The stationary cam is in reality a double internal cam and the rollers 37 travel alternately in contact with the outer surface of the cam and with the inner surface of the cam, the function of the cam being that of properly positioning the shoes as they approach the ground surface over which the wheel travels, this being true whether the wheel is travelling ahead or when reversing.

The normal travel of the wheel is in the direction of arrow F (see Fig. 1), and the normal position of the shoes is that indicated at 27—27—27, etc., that is, the shoes normally maintain a horizontal position with relation to a vertical radial line drawn through the wheel. However, as the shoes approach the positions indicated at 50 (see Fig. 1) roller 37 comes into contact with a portion of the exterior face of the internal cam indicated at 51. As the roller rides along this section of the cam, rocking movement is transmitted to the crank arm 38 through means of the collar 41 and the spring 42. This rocking movement is in turn transmitted to force the link 39 outwardly. The forward end of the shoe is thus thrown outwardly with relation to the track members, as indicated at 52, and the rear portion of the shoe is thrown inwardly against the track portion, as indicated at 53. The shoe thus placed is properly positioned for engagement with the ground surface and assumes a substantially horizontal position as indicated at 53 when the wheel begins to ride over the same. One end of the shoe is fully projected when the position 52 is reached, and it remains in a fully projected position until the wheel starts riding over the shoe as indicated at 54. The roller 37 is now thrown into engagement with the inner face of the internal cam at the point indicated at 55 and a reverse rocking movement is transmitted to the rocker arm 38 through means of the spring 42. A complete reversal has taken place when the roller reaches the position indicated at 56. The exterior surface of the internal cam now engages the roller 37 and it remains in contact therewith until the point 57 is reached. The cam 37 begins to ride free with relation to both surfaces of the cam at this point and continues to ride free with relation thereto until the point 51 is reached. The tension of the springs 26 causes the shoes to assume the position indicated at 27 during this cycle of the revolution and the tension of these springs is not only depended upon to maintain the shoes in this position, but it is also depended upon to hold the shoes in firm contact with the track members, so that excessive rattle or vibration may be eliminated. If the wheel should happen to travel in a reverse direction, or that indicated by the arrow R, (see Fig. 1) it can be seen that the rollers 37 will begin to strike the cam at the point indicated at 57. The rear end of the shoe is thus thrown outwardly and the forward end inwardly, and the shoe is thus properly positioned when it reaches the ground surface.

If any obstruction should be interposed between the flanges of the shoes and the track members, or boulders should be encountered, tilting of the shoes independent of the action of the cam and the crank arms 36 will take place as the springs 42 permit such yielding or independent movement, and danger of breakage is thus entirely obviated.

In actual practice it will be seen that a wheel constructed as here shown consists of a central hub member, a rim section concentrically disposed with relation thereto, disks securing the rim with relation to the hub, and further, that a series of shoes are disposed exteriorly of the rim and so connected that they are free to oscillate with relation to the rim at all times. It will also be noted that means are employed for properly positioning the shoes as they approach the ground surface, and that means are employed for permitting an independent movement of said shoes when obstructions are encountered. The shoes so arranged will during the rotation of the wheel successively dispose themselves on a horizontal plane in front of the wheel whether travelling ahead or reverse, thus forming a broad track surface upon which the wheel will travel. The shoes or tread sections are again successively picked up by the rear of the wheel and again properly positioned, and they are then released by the positioning mechanism so that they may be acted upon by the springs 26.

The double tread structure here shown is so arranged that the shoes are staggered. Three shoes will therefore always engage the ground surface, thus providing a large traction surface for the wheel. This is true even though the wheel tracks proper may only engage with one or two shoes due to the fact that the links form a driving connection between the rim and the shoes at all times. The traction surface presented is therefore not the surface formed between the wheel tracks and the shoe flanges, but is the actual surface presented by the shoes when engaging the ground.

While certain features of the present invention are more or less specifically illustrated, I wish it understood that various changes in form and proportion may be resorted to within the scope of the appended claims. I similarly wish it understood that the materials and finish of the several parts employed may be such as the experience and judgment of the manufacturer may dictate or various uses may demand.

Having thus described my invention, what I claim and desire to secure by Letters Patent is—

1. The combination with the rim of a traction wheel, of a series of shoes attached to the exterior face of the rim and forming a flexible track therefor, a stationary cam with relation to which the wheel rotates and a yielding connection formed between each shoe and the cam whereby movement is transmited to rock the shoes so that the portion thereof which first strikes the ground over which the wheel travels will engage the rim of the wheel before striking the ground, whether the wheel is travelling ahead or reverse.

2. A traction wheel comprising a hub, a rim concentric therewith, a series of shoes pivotally attached to the exterior face of the rim and forming a flexible track therefor, a stationary cam with relation to which the wheel rotates, a series of cross shafts journalled on the hub one for each shoe, a crank arm on each shaft, a roller on each crank engageable with the stationary cam, said cam imparting a rocking movement to each crank arm and cross shaft during rotation of the wheel, a second crank arm on each cross shaft and free to rotate thereon, a link for each shoe, said links being pivotally connected to the respective shoes and the second named crank arms, and a yielding driving connection between each cross shaft and each second named crank arm.

3. A traction wheel comprising a hub, a rim concentric therewith, a series of shoes pivotally attached to the exterior face of the rim and forming a flexible track therefor, a stationary cam with relation to which the wheel rotates, a series of cross shafts journalled on the hub one for each shoe, a crank arm on each shaft, a roller on each crank engageable with the stationary cam, said cam imparting a rocking movement to each crank arm and cross shaft during rotation of the wheel, a second crank arm on each cross shaft and free to rotate thereon, a link for each shoe, said links being pivotally connected to the respective shoes and the second named crank arms, and a helical spring forming a driving connection between each cross shaft and each second named crank arm.

4. The combination with the rim of a traction wheel, of a series of shoes disposed exteriorly of the rim and forming a flexible track therefor, a link for each shoe, said links being pivotally connected at their respective ends to the rim and the shoes, said links forming a driving connection between the rim and each shoe, and also forming a pivotal connection between each shoe and the rim, a rod pivotally attached to the center portion of each shoe, said rod being radially disposed and extending through the wheel rim, a head member on the inner end of each rod, and a spring for each rod and interposed between the head members and the rim, said springs maintaining the shoes in contact with the rim.

5. The combination with the rim of a traction wheel, of a series of shoes disposed exteriorly of the rim and forming a flexible track therefor, a link for each shoe, said links being pivotally connected at their respective ends to the rim and the shoes, said links forming a driving connection between the rim and each shoe, and also forming a pivotal connection between each shoe and the rim, a rod pivotally attached to the center portion of each shoe, said rod being radially disposed and extending through the wheel rim, a head member on the inner end of each rod, a spring for each rod and interposed between the head members and the rim, said springs maintaining the shoes in contact with the rim, and means for rocking the shoes with relation to the rim and against the tension of said springs so that predetermined positions will be assumed during rotation of the wheel.

6. The combination with the rim of a traction wheel, of a series of shoes disposed exteriorly of the rim and forming a flexible track therefor, a link for each shoe, said links being pivotally connected at their respective ends to the rim and the shoes, said links forming a driving connection between the rim and each shoe, and also forming a pivotal connection between each shoe and the rim, a rod pivotally attached to the center portion of each shoe, said rod being radially disposed and extending through the wheel rim, a head member on the inner end of each rod, a spring for each rod and interposed between the head members and the rim, said springs maintaining the shoes in contact with the rim, a stationary cam with relation to which the wheel rotates, and means actuated by the cam whereby movement is transmitted to rock the shoes against the tension of the springs so that the shoes will assume a horizontal position as they reach the ground over which the wheel travels.

JOHN J. CAMPODONICO.